US008177649B2

United States Patent
Oh (10) Patent No.: US 8,177,649 B2
(45) Date of Patent: May 15, 2012

(54) CONSTANT VELOCITY JOINT OF TRIPOD TYPE

(75) Inventor: Seung Tark Oh, Farmington Hills, MI (US)

(73) Assignee: Hyundai Wia Corporation (KR)

( * ) Notice: Subject to any disclaimer, the term of this patent is extended or adjusted under 35 U.S.C. 154(b) by 751 days.

(21) Appl. No.: 12/139,427

(22) Filed: Jun. 13, 2008

(65) Prior Publication Data

US 2009/0312108 A1    Dec. 17, 2009

(51) Int. Cl.
*F16D 3/205* (2006.01)
(52) U.S. Cl. ......................................... 464/111; 464/905
(58) Field of Classification Search .................. 464/111, 464/132, 905
See application file for complete search history.

(56) References Cited

U.S. PATENT DOCUMENTS

| | | | |
|---|---|---|---|
| 5,203,741 A | 4/1993 | Turner et al. | |
| 5,474,500 A * | 12/1995 | Girguis | 464/111 |
| 6,497,621 B2 * | 12/2002 | Kudo et al. | 464/111 |
| 6,699,134 B2 | 3/2004 | Sams et al. | |
| 6,726,570 B2 | 4/2004 | Sugiyama et al. | |
| 6,893,351 B2 | 5/2005 | Ishiguro et al. | |
| 2004/0157667 A1 | 8/2004 | Ishijima et al. | |

* cited by examiner

*Primary Examiner* — Gregory Binda
(74) *Attorney, Agent, or Firm* — Park & Associate IP Law, P.C.

(57) ABSTRACT

A constant velocity joint for a drive system with a first rotating shaft and a second rotating shaft, comprises: a hollow housing having a plurality of guide grooves therein, the guide grooves extending in an axial direction of the housing and spaced equally apart in a circumferential direction of the housing; a tripod having a plurality of trunnions, each trunnion positioned in a corresponding one of the guide grooves of the hollow housing; and a roller assembly disposed on each trunnion, the roller assembly including an outer roller for rollably receiving in the corresponding guide groove; wherein the outer roller includes a convex outer surface, the convex outer surface having a first radius (Rry) seen from a cross section taken in an orthogonal direction relative to a central axis of the outer roller, the convex outer surface having a second radius (Rrx) seen from a cross section taken along the central axis of the outer roller, a center of the second radius (Rrx) displaced outwardly from a center of the first radius (Rry), and the second radius (Rrx) being shorter than the first radius (Rry). Each of the guide grooves of the housing includes a concave surface for mating with the convex outer surface of the outer roller, and the guide groove further includes a plurality of recess areas respectively recessed from the concave surface of the groove, and thereby defining widened spaces between the guide groove of the housing and its corresponding upper and lower portions of the convex outer roller.

5 Claims, 6 Drawing Sheets

FIG. 1

(PRIOR ART)

(PRIOR ART)

FIG. 3

(PRIOR ART)

FIG. 6

CONSTANT VELOCITY JOINT OF TRIPOD TYPE

FIELD OF THE INVENTION

The present invention relates to a constant velocity joint of tripod type, which is disposed between a drive shaft and a driven shaft coupled to each other and typically used in a drive axle of, for example, an automobile for transmitting rotational torque between the rotating shafts.

BACKGROUND OF THE INVENTION

Tripod type constant velocity joints are well known in the automobile industry as one type of constant velocity joints used in the drive system of automobiles to transfer a uniform torque and a constant speed, while operating with a wide range of joint angle.

For instance, one example of the tripod type constant velocity joint was illustrated in Japanese Patent Application, S62-233522. This tripod type constant velocity joint typically includes tripod fixed to an end of the second rotating shaft, which functions as a driven member, and hollow cylindrical housing fixed to an end of the first rotating shaft which functions as a drive member. Three circumferential grooves are formed at three locations on the inner face of the housing at equal spacing in the circumferential direction and extend in the shaft direction of the housing. Each tripod comprises a boss connected to the second rotating shaft, and each trunnion has a cylindrical shape and extends radially from three locations at equal spacing around the boss. Each trunnion has a roller fixed at a distal end of the trunnion and with needle rollers engaged therein. In this arrangement, each roller can freely rotate about the trunnion while also be displaced in the axial direction of the trunnion. The constant velocity movement between the first and second rotating shafts is ensured with the rollers rotatably and displaceably engaging in the grooves disposed along the inner face of the housing. In order to facilitate the sliding movement, a pair of side faces are formed in circular recesses on each side of the respective grooves, and each roller is supported rotatably and pivotally along the side faces of the grooves.

When the first and second rotating shafts rotate with a joint angle present between the first and second shafts, each roller moves with complexity. For example, each roller moves in the axial direction of the housing along each of the side faces of the respective guide grooves, while the rollers change in orientation and further displace in the axial direction of the trunnion. Such movement of the rollers cannot cause a relative movement between a peripheral outside face of each of the rollers and each of the side faces to be smoothly made. Thus, a relatively large friction occurs between the faces. As a result, this tripod type constant velocity joint produces three-directional axial forces as the shafts rotate. In the application of a prior art tripod joint to the vehicles, it is known that the axial forces may cause a transverse vibration typically referred to as "shudder". This shudder disturbance may become severe particularly when a large torque is transmitted with a relatively large joint angle present.

In order to restrain or reduce such conventional shudder phenomena, various suggestions have been introduced. Among various attempts, the inventors of this application have particularly discovered that the conventional shudder problem can be reduced by providing sufficient lubrication channels in the contact surfaces between the convex outer surface of the roller and the corresponding inner surface of respective guide grooves of the housing and also by optimally controlling the distribution of the contact force and/or the contact angle between the roller and the corresponding contact groove of the housing.

Figure 1:
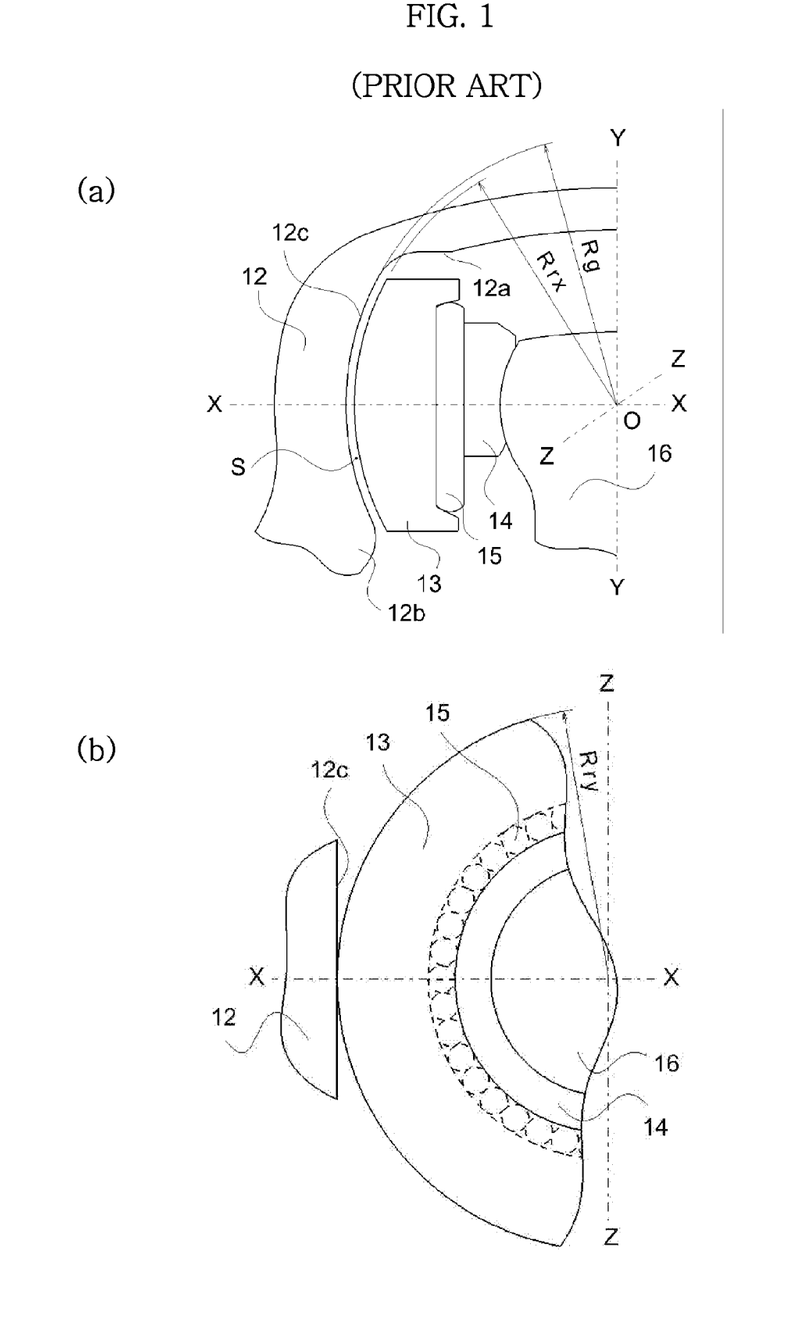
FIG. 1 shows partial cross-sectional views illustrating an exemplary construction of a conventional tripod type constant velocity joint.

FIG. 1 illustrates an example of a conventional constant velocity joint, which includes a housing 12 of an outer joint member (i.e., a driving member), and three radially-projecting trunnions 16 of an inner joint member (i.e., a driven member) internally coupled within respective guide groove of the housing 12. Each trunnion 16 is received within a roller assembly which is composed of outer roller 13, inner roller 14, and multiple needle bearings 15 engaged between the outer and inner rollers 13 and 14. As shown, the guide groove has a circular cross-sectional shape with a surface radius Rg, and the outer surface of the outer roller 13 similarly has a circular cross-sectional shape with a surface radius Rrx (in the cross section taken along the axis of the trunnion 16 or the outer roller 13, as shown in the upper drawing of FIG. 1). The radius Rrx of the outer roller 13 is a little smaller than the radius Rg of the housing 12, thus leaving a clearance "S" there-between, which is necessary in order to manufacture and assemble the apparatus. In addition, lubricants (e.g., grease) can be filled in this clearance "S" for lubrication and to reduce frictions in the contact areas. As shown in the lower drawing of FIG. 1, the outer roller 13 further includes another circular cross-sectional shape with a surface radius Rry (in the cross section taken in orthogonal direction relative to the axis of the trunnion 16 or the outer roller 13).

In operation, the trunnion 16 can be displaced radially and pivotally relative to the guide groove of the housing 12, and this movement of the trunnion 16 associated with the resultant friction with the roller assembly causes the outer roller 13 to move reciprocally in an axial direction (e.g., in the Y-axis direction in FIG. 1), in part, due to the presence of clearance "S".

Figure 2:
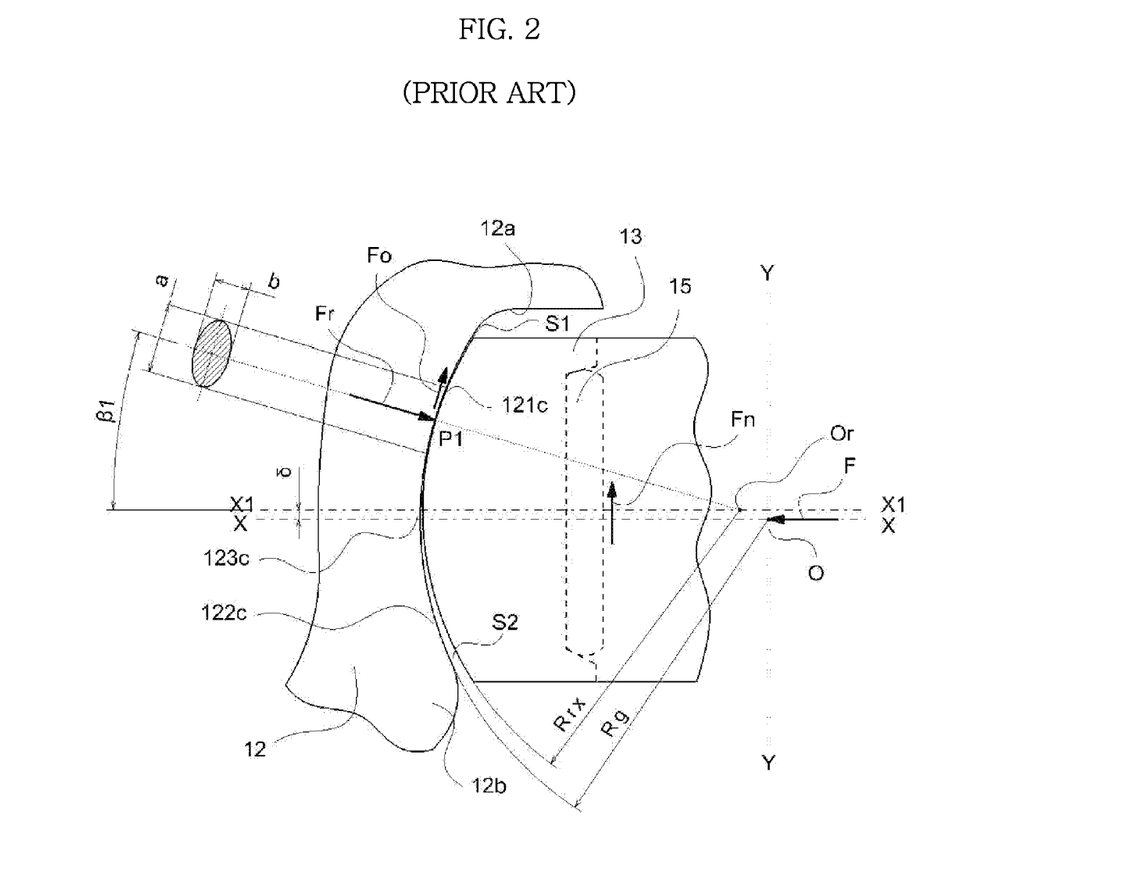
FIG. 2 shows a partial cross-sectional view of the conventional tripod type constant velocity joint as shown in FIG. 1, in which the outer roller is displaced upwardly relative to the outer housing of the constant velocity joint.
Figure 3:
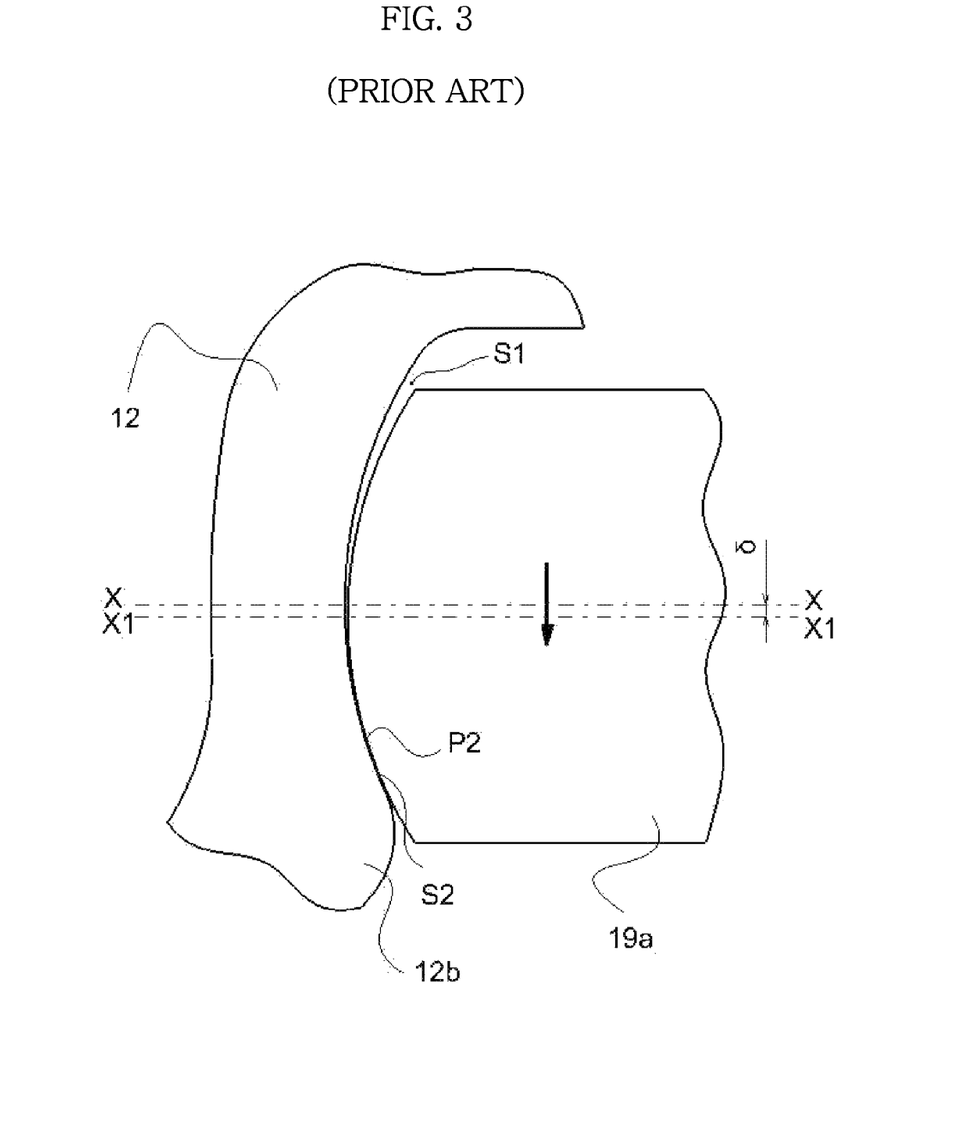
FIG. 3 shows a view similar to FIG. 2, in which the outer roller is displaced downwardly relative to the outer housing of the constant velocity joint.

As illustrated in FIG. 2, when the outer roller 13 moves upwardly in the groove of the housing 13, the outer roller 1 3 contacts with the housing at "P1" on an upper portion of the housing groove with axial displacement δ and contact angle β defined therein. This causes the clearance S1 at upper portion 121c of the housing groove to be substantially narrowed while enlarging the clearance S2 at lower portion 122c of the housing groove. As a result, the grease filled in the upper clearance S1 squeezes out from the clearance and the contact friction increases substantially, and thus, causing to generate adverse vibrations or disturbance to the vehicle. As illustrated in FIG. 3, when the outer roller 13 moves downwardly in the groove of the housing 13, the outer roller 13 contacts with the housing at "P2" on a lower portion of the housing groove with its axial displacement δ and contact angle β defined thereby. This causes the clearance S2 at the lower portion of the housing groove to be substantially narrowed while enlarging the clearance S1 at the upper portion of the housing groove. As a result, the grease filled in the lower clearance S2 squeezes out from the clearance and the contact friction increases substantially, and thus, causing to generate adverse vibrations or disturbance to the vehicle. In the drawing, the undefined reference "O" is the center of the opposing housing grooves, and reference "Or" is the center of the displaced outer roller 13.

SUMMARY OF THE INVENTION

In order to solve the above described and other problems or drawbacks known in the conventional constant velocity joints, the present invention provides a tripod type constant velocity joint with a reliable and compact structure which can also reduce the conventional shudder phenomena, preferably, by providing effective lubricant channels and also by optimally controlling the distribution of the contact force and/or the contact angle between the roller and the corresponding contact groove of the housing.

Figure 4:
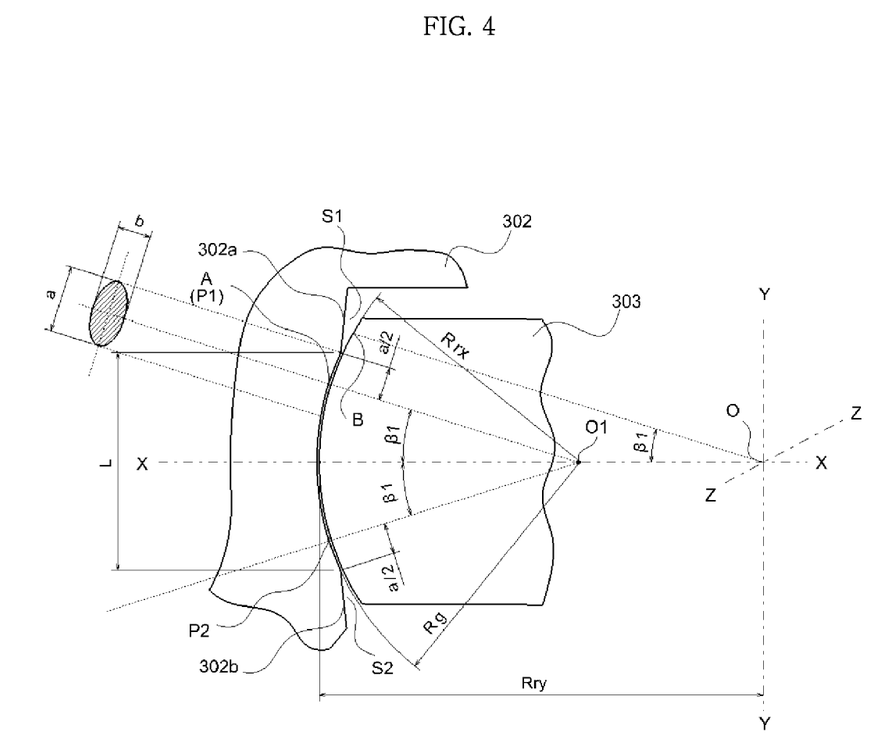
FIG. 4 is a partial cross-sectional view of a tripod type constant velocity joint, constructed according to one preferred embodiment of the present invention.

In order to provide more spacious lubricant channels for reducing the frictional force in the contact areas, it would be better to reduce both the elliptical contact area (such as the cross hatched region in FIG. 4) and the contact angle β1 (FIG. 4). According to Hertzian theory, the contact area between the parts under load is determined by the amount of the load, the mechanical strength (e.g., elastic deformation coefficients) of the parts, and surface curvature of the contact area. Thus, if the contact area is reduced excessively, the mechanical strength and durability of the assembly will be deteriorated due to the increase in the surface contact stress of the parts. On the other hand, due to the design limitations it is more difficult to adjust the contact angle rather than to reduce the elliptical contact area. This is because the contact angle β1 under a load is primarily determined by the rolling friction coefficient μ (as the contact angle is a function of the friction coefficient, namely, β1=a tan(2μ/cos θ)) except when the roller assembly is guided in the housing groove with the outer roller tilted and guided in the track of the housing in Z direction during the rotation of the joint. Thus, substantial considerations are made in the present invention to determine the curvature of the housing groove and its corresponding outer surface of the outer roller, and the contact area and the contact angle are optimized.

The applicant (namely, the inventor) of present invention has discovered, among others, the following two solutions to reduce the elliptical contact areas for the purposes of providing more grease channels in the contact areas of the constant velocity joints and reducing the frictions there-between. One is by changing the curvatures of the housing groove and its corresponding outer roller. The other is by reducing a load applying on the housing groove, preferably by distributing a concentrated load to two or more distributed loads. In conventional tripod joints as shown in FIG. 1, the surface curvature or radius (Rrx) of the outer roller 13 seen from the cross section taken along the axis of the trunnion 16 or the outer roller 13 is identical to the surface curvature or radius (Rry) of the outer roller 13 seen from the cross section taken in orthogonal direction relative to the axis of the trunnion 16 or the outer roller 13. In this joint, as shown in FIG. 1, the inner surface radius (Rg) of the housing groove, seen from the cross section taken in orthogonal direction relative to the axis of the housing groove, is approximately as same as, but a little larger than, the surface radius Rrx of the outer roller 13 by the clearance margin of "S".

Figure 5:
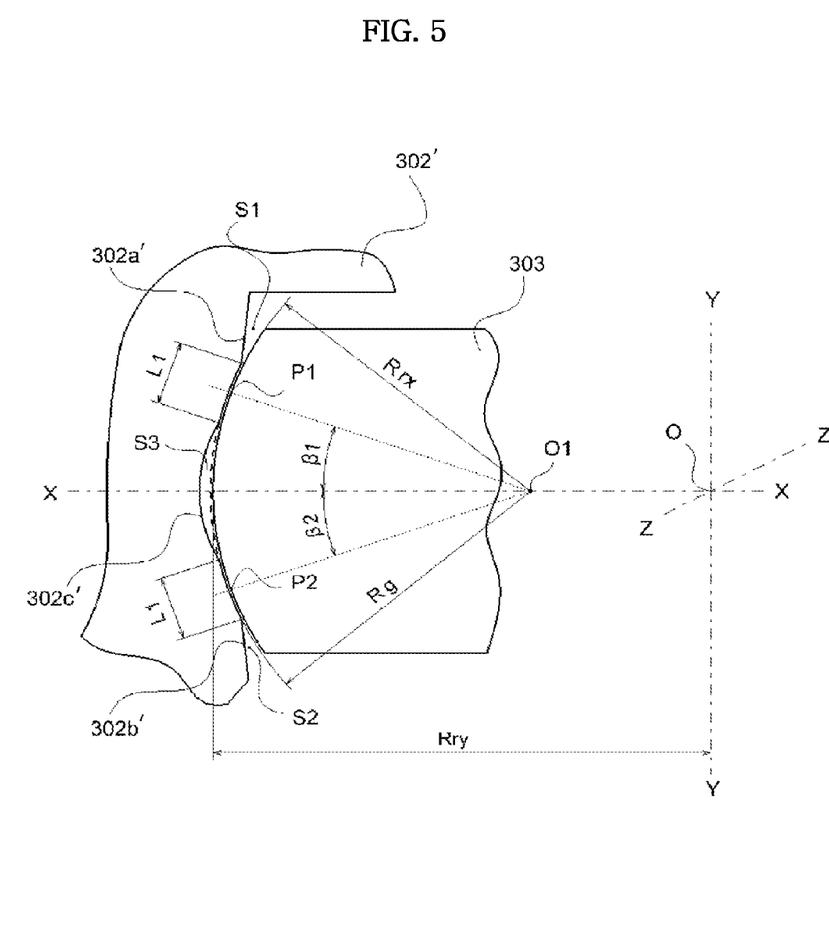
FIG. 5 is a partial cross-sectional view of a tripod type constant velocity joint, constructed according to another preferred embodiment of the present invention.
Figure 6:
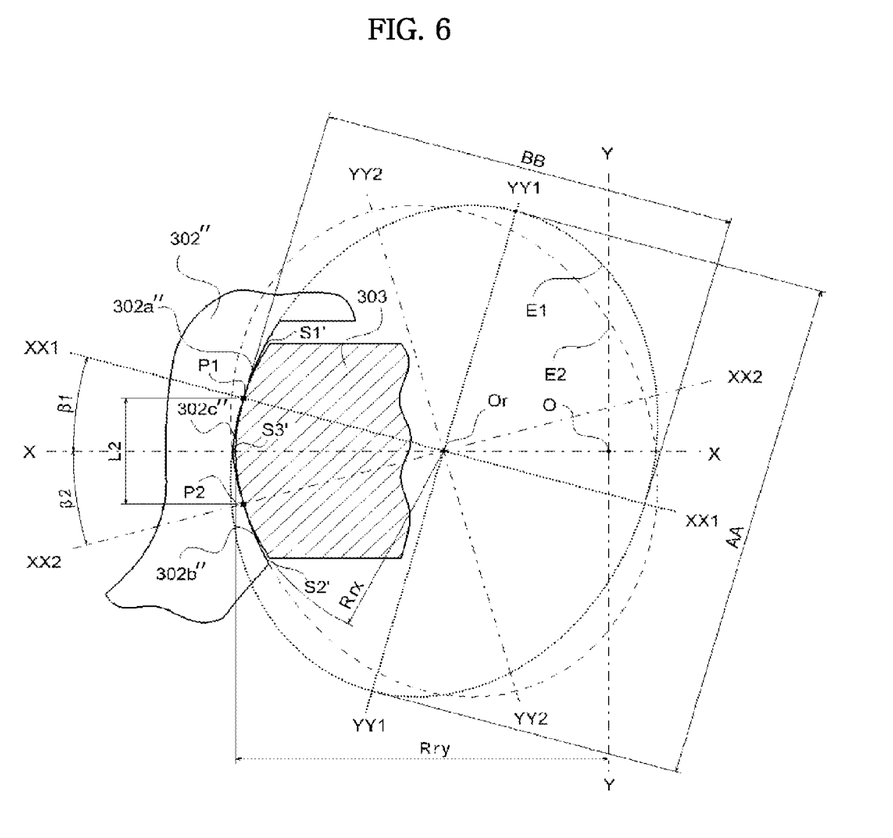
FIG. 6 is a partial cross-sectional view of a tripod type constant velocity joint, constructed according to another preferred embodiment of the present invention.

The present applicant has also discovered that the elliptical contact areas can be reduced by having the radii Rrx and Rg shortened while maintaining the radius Rry the same, for example, as illustrated in FIGS. 4-6 of the present invention. In FIGS. 4-6, seen from the cross section taken in orthogonal direction relative to the axis of the housing groove, the center "O1" of both the radial inner surface of the housing groove (having the radius Rg) and the radial outer surface of the outer roller 13 (having the radius Rrx) are displaced outwardly from the center "O" of the radial outer surface of the outer roller 13 (having the radius Rry) seen from the cross section taken in orthogonal direction relative to the axis of the trunnion 16 or the outer roller 13. This modified configuration of the invention can facilitate the reduction of the frictional force in the contact areas.

The present invention further provides an enlarged grease space in the contact areas between the housing groove and its corresponding outer roller to effectively fill the lubricant grease for reducing the frictions there-between. This can be realized by modifying the inner track or groove structure of the housing. In one preferred embodiment as illustrated in FIG. 4 and FIG. 5, the inner track structure of the housing is modified to provide an upper side recess area S1 and a lower side recess area S2. In another preferred embodiment as illustrated in FIG. 5, the inner track structure of the housing is further modified to provide an inner recess area S3 for filling more grease in the recess area. This modified structure further facilitates distribution of a concentrated load to multiple distributing loads at upper and lower sides of the outer roller, and thus, enabling a further reduction of the frictional forces in the contact area.

According to the embodiments shown in FIGS. 4 and 5, the size L of the cylindrical or concave groove area of the housing groove is preferably determined to cover the elliptical contact areas (e.g., the cross-hatched area in FIG. 4) in the upper and lower sides of the housing groove. Thus, the inner starting points of the upper recess area S1 and the lower recess area S2 are determined to be coincident with, or located a little (preferably, up to 12 mm) outside from, the outermost points of the elliptical contact areas. The concave groove size L is preferably in a range determined by the equation of: L/Rry=0.25-0.6.

In the embodiment as shown in FIG. 5, the size L1 of the upper and lower concave (e.g., cylindrical) groove portions is respectively selected to have a dimension the same or a little (preferably, up to 4 mm) larger than the dimension "a" of the elliptical contact area. As a result, the size of inner recess S3 is also determined accordingly.

According to another preferred embodiment as illustrated in FIG. 6, the inner track structure of the housing is modified to provide an upper recess area S1', a lower recess area S2', and an inner recess area S3' for filling more grease in the recess area. This modified structure further facilitates distribution of a load to multiple (e.g., two) distributing loads at upper and lower sides of the outer roller, and thus, enabling a further reduction of the frictional forces in the contact area. In this embodiment, the inner surface of the housing groove is particularly configured to have a first elliptical surface in the upper half of the inner housing groove and a second elliptical surface in the lower half of the inner housing groove, in which the center "Or" of the two ellipses is coincident at the same location and is displaced outward to a distance from the center "O" of the outer roller. The two ellipses of the housing groove respectively have a longer diameter AA and a shorter diameter BB. The ratio BB/AA of the two diameters is preferably between 0.65 and 0.95, and the ratio AA/2Rrx is preferably between 1.1 and 1.4.In this embodiment, the size L2 (that is the distance between two contact points P1 and P2 where the outer roller contacts with the housing groove composed of two elliptical surfaces) is preferably selected to have a dimension in a range between 0.60 BB and 0.85 BB where BB refers to the shorter diameter of the two ellipses.

In this embodiment, due to the curvature difference of between the circular outer surface of the outer roller and the elliptical contour of the housing groove, the elliptical contact areas can be reduced than that of the conventional one (as shown in FIG. 1) in which the outer surface of the outer roller and the inner surface of the housing groove have concentric circular shapes. However, it is noted that the reduction of the elliptical contact area is to be limited to a suitable degree in consideration of the required mechanical strength of the outer roller and the housing. Thus, the curvatures of the roller and the housing groove should be determined based on the design requirements of the constant velocity joint.

According to one preferred embodiment of the present invention, a constant velocity joint for a drive system (having a first rotating shaft and a second rotating shaft coupled with the constant velocity joint) comprises: a hollow housing having a plurality of guide grooves therein, the guide grooves extending in an axial direction of the housing and spaced equally apart in a circumferential direction of the housing; a tripod having a plurality of trunnions, each trunnion positioned in a corresponding one of the guide grooves of the hollow housing; and a roller assembly disposed on each trunnion, the roller assembly including an outer roller for rollably receiving in the corresponding guide groove. The outer roller includes a convex outer surface, the convex outer surface having a first radius (Rry) seen from a cross section taken in an orthogonal direction relative to a central axis of the outer roller, the convex outer surface having a second radius (Rrx) seen from a cross section taken along the central axis of the outer roller, a center of the second radius (Rrx) displaced outwardly from a center of the first radius (Rry), and the second radius (Rrx) being shorter than the first radius (Rry). Each of the guide grooves of the housing includes a concave surface for mating with the convex outer surface of the outer roller, the guide groove further includes upper and lower recess areas respectively recessed from the concave surface of the groove, and thereby defining widened spaces between the guide groove of the housing and its corresponding upper and lower portions of the convex outer roller.

The length (L) of the concave portion of the guide groove is preferably the same as or a little longer than a distance covering elastic contact areas at the upper and lower portions of the outer roller. The length (L) of the concave portion of the guide groove is preferably in a range selected from an equation of: $L/Rry=0.25-0.6$.

According to another preferred embodiment of the invention, the guide groove further includes an inner recess area recessed from an inner or central area in the concave surface of the groove for defining a widened space between the guide groove of the housing and its corresponding portion of the convex outer roller.

According to another preferred embodiment of the present invention, the constant velocity joint for a drive system comprises: a hollow housing having a plurality of guide grooves therein, the guide grooves extending in an axial direction of the housing and spaced equally apart in a circumferential direction of the housing; a tripod having a plurality of trunnions, each trunnion positioned in a corresponding one of the guide grooves of the hollow housing; and, a roller assembly disposed on each trunnion, the roller assembly including an outer roller for rollably receiving in the corresponding guide groove. The outer roller includes a convex outer surface, the convex outer surface having a first radius (Rry) seen from a cross section taken in an orthogonal direction relative to a central axis of the outer roller, the convex outer surface having a second radius (Rrx) seen from a cross section taken along the central axis of the outer roller, a center of the second radius (Rrx) displaced outwardly from a center of the first radius (Rry), and the second radius (Rrx) being shorter than the first radius (Rry). Each guide groove of the housing is formed with a first elliptical surface in an upper half of the housing groove and a second elliptical surface in a lower half of the housing groove, the center of the first and second elliptical surface is located at the same location with or in proximity of the center of the second radius (Rrx) of the outer roller.

The first and second ellipse shapes of the housing groove are preferably formed of the same ellipse with a longer diameter (AA) and a shorter diameter (BB). The ratio BB/AA of the two diameters is preferably between 0.65 and 0.95, and ratio AA/2Rrx is preferably between 1.1 and 1.4. The distance (L2) between two contact points where the outer roller regularly contacts with the housing groove composed of the two elliptical surfaces is selected to have a dimension in a preferable range between 0.60 BB and 0.85 BB. The ratio BB/AA and a size of elastic contact areas of between the outer roller and the housing groove are selected, preferably, in further consideration of mechanical strength requirements of the outer roller and the housing.

BRIEF DESCRIPTION OF THE DRAWINGS

The above described and other objects, features and advantages of the present invention will be more apparent from the presently preferred embodiments of the invention disclosed in the following description and illustrated in the accompanying drawings, in which.

DETAILED DESCRIPTION OF THE INVENTION

Referring to FIGS. 4-6 of the drawings, the tripod type constant velocity joints of the present invention are described herein in details with several exemplary or preferred embodiments thereof. However, the following descriptions of such embodiments are intended primarily for illustrating the principles and exemplary constructions of the constant velocity joints of the present invention, and the present invention is not specifically limited to these exemplary embodiments. Thus, one skilled in the art can appreciate or recognize that various modifications and substitutions can be made thereto without departing from the spirit and scope of the present invention.

Common elements and general constructions of the constant velocity joints of the type to which the present invention is related are known in the art and described, for example, in the present applicant's prior applications Ser. No. 11/750,138 (which is now U.S. Pat. No. 7,819,752), Ser. No. 11/840,194 (which is now U.S. Pat. No. 7,878,914), and Ser. No. 11/947,307, and the entire contents of which are incorporated herein by reference. Accordingly, detailed descriptions of the constant velocity joints are not repeated herein for simplicity purposes.

With reference to FIG. 4, one preferred embodiment of the present invention is described below with further details. In this embodiment, in order to provide more grease channels in the contact areas of the constant velocity joints than that of the conventional joints as shown in FIG. 1, the center "O1" of both the radial inner surface of the housing groove and the radial outer surface of the outer roller 303 (both surfaces seen from the cross section taken in orthogonal direction relative to the axis of the housing groove) is displaced outwardly from the center "O" of the radial outer surface of the outer roller 303 (having the radius Rry) which surface is seen from the cross section taken in orthogonal direction relative to the axis of the outer roller 303. Accordingly, the curvatures or radius of the radial inner surface of the housing groove and the radial outer surface of the outer roller are substantially reduced relative to the conventional joints as shown in FIG. 1. Thus, this modification leads to effectively reduce the elliptical contact areas between the outer roller and inner housing groove, and results in the reduction of the adverse frictional force in the contact areas as discussed above.

Moreover, having the center "O1" of the radial outer surface of the outer roller 303 displaced outwardly, the size of the outer roller 303 can be reduced more compactly and the shape of the housing 302 can be modified effectively, for example, to provide lateral recesses 302a and 302b at the upper and lower sides of the housing groove while maintaining or otherwise reducing the size of the housing 302.

Referring still to FIG. 4, the contact angle β1 is typically determined by the design requirements of the joints. Having the center "O1" of the radial outer surface of the outer roller 303 displaced outwardly from the center "O", while maintaining the contact angle β1 the same, the contact points of the outer roller 303 against the housing 302 moves inwardly from point B (which is equivalent to the contact point P1 of the conventional joint of FIG. 1) to point A. As a result, the thickness of the outer roller 303 and the size of the housing groove (and thus, of the housing 302) can be reduced than that of the conventional joint, and accordingly, the joint of the present invention can be made in a compact size and reduced weight.

According to the present invention as illustrated in FIG. 4, the inner structure of the housing is further modified to provide an upper side recess area S1 and a lower side recess area S2, by removing the radial surface portions in the upper and lower sides of the housing. Due to these enlarged recess areas S1 and S2, lubricating grease can be more easily filled or introduced in the contact areas of the joints, and the adverse frictions can be limited.

In this embodiment, the size L of the concave housing groove is preferably selected to cover the elliptical contact areas (the cross-hatched area in FIG. 4) in the upper and lower sides of the housing groove. Thus, the inner starting points of the upper recess area S1 and the lower recess area S2 are set to be the same location with, or located a little (preferably, up to 12 mm) outside from, the outermost points of the elliptical contact areas of the joints. The concave groove size L is preferably in a range determined by the equation of: L/Rry=0.25-0.6.

With reference to FIG. 5, another preferred embodiment of the present invention is described below. This embodiment is similar to the embodiment of FIG. 4 described above, and the description of common features thereof are to be referred above and not repeated herein for simplicity purposes. This embodiment, however, further includes an additional recess area, namely the inner recess area S3, in addition to the upper and lower recesses S1 and S2. Thus, this embodiment can receive a further amount of grease in the three (or more) recess areas, and the contact frictions can be further limited.

In this embodiment, the overall length L of the concave housing groove is determined in the same manner as that of the previous embodiment of FIG. 4. Accordingly, the size L of the concaved (e.g., cylindrical) groove is set to cover the elliptical contact areas in the upper and lower sides of the housing groove. In addition, the concave groove size L is preferably in a range determined by the equation of: L/Rry=0.25-0.6. Moreover, the size L1 of each of the upper and lower concave groove portions is respectively selected to have a dimension the same or a little (preferably, up to 4 mm) larger than the dimension "a" of the elliptical contact area. As a result, the size of inner recess S3 is also determined accordingly.

With reference now to FIG. 6, another preferred embodiment of the present invention is described below. This embodiment is constructed with similar basic concepts or principles as the above described embodiments of FIGS. 5 and 6. However, the concave groove of the housing 302" (seen from the cross section taken in a perpendicular direction relative to the longitudinal axis of the groove) is composed of two elliptical surfaces, namely, a first elliptical surface (of contour E1) in the upper half of the inner housing groove and a second elliptical surface (of contour E2) in the lower half of the inner housing groove. Here, the center "Or" of the two ellipses is located at the same location with, or in proximity of, the center of the second radius (Rrx) of the outer roller, which location is displaced outwardly to a predetermined distance from the center "O" of the circular outer roller 303 (seen from the cross-section taken in a perpendicular direction to the axis of the outer roller). The two ellipses of the housing groove respectively have a longer diameter AA and a shorter diameter BB. The ratio BB/AA of the two diameters is preferably between 0.65 and 0.95, and the ratio AA/2Rrx is preferably between 1.1 and 1.4.

As shown in FIG. 6 (seen from the cross-section taken along the axis of the outer roller), the outer surface of the outer roller 303 has a circular shape (with radius Rrx and center "Or"). Thus, as the circular outer roller 303 contacts with the two elliptical inner surfaces of the housing, three recessed areas are formed between the two parts, namely, an upper recess area S1' at the upper groove region 302a", a lower recess area S2' at the lower groove region 302b", and an inner recess area S3' at the central groove region 302c". These recessed spaces are suitable for retaining lubricant grease therein, and thus, this embodiment is also effective in reducing the frictional contacts in the joints.

In addition, this modified structure of FIG. 6 further facilitates distribution of a load to multiple (e.g., two) distributing loads at upper and lower sides of the outer roller, and thus, enabling a further reduction of the frictional forces in the contact areas. In this embodiment, the size L2 (that is the distance between two contact points P1 and P2 where the outer roller contacts with the housing groove composed of two elliptical surfaces) is preferably selected to have a dimension in a range between 0.60 BB and 0.85 BB where BB refers to the shorter diameter of the two ellipses.

In this embodiment, due to the curvature difference of between the circular outer surface of the outer roller 303 and the two elliptical contour of the housing groove, the elliptical contact areas between the parts can be reduced than that of the conventional one (as shown in FIG. 1) in which the outer surface of the outer roller and the inner surface of the housing groove have concentric circular shapes (i.e., same curvature). However, it is noted that the reduction of the elliptical contact area is to be limited to a suitable degree in consideration of the required mechanical strength of the outer roller and the housing. Thus, the curvatures of the roller and the housing groove should be determined based on the design requirement of the constant velocity joint.

As described above in connection with several exemplary embodiments thereof, the contour and surface curvatures of the outer roller and the inner housing groove of the constant velocity joints are modified to reduce the contact or rolling frictions between the outer roller and the housing. Moreover, the present invention provides ample and effective grease channels in the contact areas between the outer roller and the housing groove for retaining greases therein, and thus, further reducing the frictional contacts between the parts. Further, the present invention provides a suitable structure for distributing a concentrated load to two or more distributed loads along the inner surface of the housing, and thus, enabling a further reduction of the frictional forces in the contact areas of the joints.

The above disclosed embodiments of the invention are representatives of a presently preferred form of the invention, but are intended to be illustrative rather than definitive thereof. Accordingly, those skilled in the art will appreciate or recognize that various modifications and substitutions can be made thereto without departing from the spirit and scope of the present invention as set forth in the appended claims.

What is claimed is:

1. A constant velocity joint for a drive system comprising:
   a hollow housing having a plurality of guide grooves therein, the guide grooves extending in an axial direction of the housing and spaced equally apart in a circumferential direction of the housing;
   a tripod having a plurality of trunnions, each trunnion positioned in a corresponding one of the guide grooves of the hollow housing; and
   a roller assembly disposed on each trunnion, the roller assembly including an outer roller for rollably receiving in the corresponding guide groove;
   wherein the outer roller includes a convex outer surface, the convex outer surface having a first radius (Rry) seen from a cross section taken in an orthogonal direction relative to a central axis of the outer roller, the convex outer surface having a second radius (Rrx) seen from a cross section taken along the central axis of the outer roller, a center of the second radius (Rrx) displaced outwardly from a center of the first radius (Rry), and the second radius (Rrx) being shorter than the first radius (Rry);
   wherein each of the guide grooves of the housing is formed with a first elliptical surface in an upper half of the housing groove and a second elliptical surface in a lower half of the housing groove, the second ellipse being different from the first ellipse, and wherein the centers of the first and second elliptical surfaces are located at the same location with or in proximity of the center of the second radius (Rrx) of the outer roller.

2. The constant velocity joint of claim 1, wherein the first and second elliptical surfaces are respectively a part of first and second ellipses with a longer diameter (AA) and a shorter diameter (BB), and ratio BB/AA of the two diameters is between 0.65 and 0.95, and ratio AA/2Rrx is between 1.1 and 1.4.

3. The constant velocity joint of claim 2, wherein a distance (L2) between two contact points where the outer roller regularly contacts with the housing groove composed of the two elliptical surfaces is selected to have a dimension in a range between 0.60 BB and 0.85 BB.

4. The constant velocity joint of claim 2, wherein the ratio BB/AA and a size of elastic contact areas of between the outer roller and the housing groove are selected in further consideration of mechanical strength requirements of the outer roller and the housing.

5. The constant velocity joint of claim 1, wherein at least three recessed areas are formed between the convex outer surface of the outer roller and the guide groove of the housing, the three recessed area including an upper recess area at an upper groove region of the groove, a lower recess area at a lower region of the groove, and an inner recess area at a central region of the groove, the recessed areas suitable for retaining lubricant therein.

* * * * *